(12) United States Patent
Lee et al.

(10) Patent No.: US 9,843,034 B2
(45) Date of Patent: Dec. 12, 2017

(54) POROUS SILICON-BASED ANODE ACTIVE MATERIAL, METHOD OF PREPARING THE SAME, AND LITHIUM SECONDARY BATTERY INCLUDING THE ANODE ACTIVE MATERIAL

(71) Applicant: LG Chem, Ltd., Seoul (KR)

(72) Inventors: Yong Ju Lee, Daejeon (KR); Mi Rim Lee, Daejeon (KR); Jung Woo Yoo, Daejeon (KR); Je Young Kim, Daejeon (KR)

(73) Assignee: LG Chem, Ltd. (KR)

( * ) Notice: Subject to any disclaimer, the term of this patent is extended or adjusted under 35 U.S.C. 154(b) by 581 days.

(21) Appl. No.: 14/483,283

(22) Filed: Sep. 11, 2014

(65) Prior Publication Data

US 2014/0377643 A1    Dec. 25, 2014

Related U.S. Application Data

(63) Continuation of application No. PCT/KR2014/004635, filed on May 23, 2014.

(30) Foreign Application Priority Data

May 30, 2013    (KR) .......................... 10-2013-0061794

(51) Int. Cl.
*H01M 4/134* (2010.01)
*C01B 33/02* (2006.01)
(Continued)

(52) U.S. Cl.
CPC ............. *H01M 4/134* (2013.01); *C01B 33/02* (2013.01); *H01M 4/0471* (2013.01);
(Continued)

(58) Field of Classification Search
CPC .. H01M 4/134; H01M 4/1395; H01M 4/0471; H01M 4/386; H01M 4/366; H01M 4/625; H01M 10/052; C01B 33/02
See application file for complete search history.

(56) References Cited

U.S. PATENT DOCUMENTS

2004/0214085 A1    10/2004   Sheem et al.
2008/0145757 A1     6/2008   Mah et al.
(Continued)

FOREIGN PATENT DOCUMENTS

EP      2579365 A1     4/2013
KR   2004-0063802 A    7/2004
(Continued)

OTHER PUBLICATIONS

Lee et al., "Anomalous Shape Changes of Silicon Nanopillars by Electrochemical Lithiation," Jun. 9, 2011, Nano Letters, 11, 3034-3039.*
(Continued)

*Primary Examiner* — Ula C Ruddock
*Assistant Examiner* — Matthew W Van Oudenaren
(74) *Attorney, Agent, or Firm* — Lerner, David, Littenberg, Krumholz & Mentlik, LLP

(57) ABSTRACT

Provided are a porous silicon-based anode active material including crystalline silicon (Si) particles, and a plurality of pores on surfaces, or the surfaces and inside of the crystalline silicon particles, wherein at least one plane of crystal planes of at least a portion of the plurality of pores includes a (100) plane, and a method of preparing the porous silicon-based anode active material. Since a porous silicon-based anode active material of the present invention may allow volume expansion, which is occurred during charge and discharge of a lithium secondary battery, to be concentrated on pores instead of the outside of the anode active material,
(Continued)

the porous silicon-based anode active material may improve life characteristics of the lithium secondary battery by efficiently controlling the volume expansion.

27 Claims, 5 Drawing Sheets

(51) Int. Cl.
*H01M 10/0525* (2010.01)
*H01M 4/04* (2006.01)
*H01M 4/36* (2006.01)
*H01M 4/38* (2006.01)
*H01M 4/1395* (2010.01)
*H01M 4/62* (2006.01)
*H01M 10/052* (2010.01)

(52) U.S. Cl.
CPC ......... *H01M 4/1395* (2013.01); *H01M 4/366* (2013.01); *H01M 4/386* (2013.01); *H01M 4/625* (2013.01); *H01M 10/052* (2013.01); *Y10T 428/2982* (2015.01)

(56) References Cited

U.S. PATENT DOCUMENTS

| | | |
|---|---|---|
| 2010/0301276 A1 | 12/2010 | Lee et al. |
| 2011/0097629 A1* | 4/2011 | Yew ..................... H01M 4/134 429/231.8 |
| 2011/0111294 A1* | 5/2011 | Lopez .................. H01M 4/134 429/217 |
| 2012/0100438 A1 | 4/2012 | Fasching et al. |
| 2013/0040412 A1 | 2/2013 | Park et al. |
| 2013/0122717 A1 | 5/2013 | Green et al. |
| 2014/0147751 A1 | 5/2014 | Yang et al. |
| 2014/0248539 A1 | 9/2014 | Liu |

FOREIGN PATENT DOCUMENTS

| | | |
|---|---|---|
| KR | 2010-0127990 A | 12/2010 |
| KR | 10-1114492 B1 | 2/2012 |
| TW | 201133983 A | 10/2011 |
| WO | 2011/053736 A1 | 5/2011 |
| WO | 2011124893 A2 | 10/2011 |
| WO | 2012126338 A1 | 9/2012 |
| WO | 2013050785 A1 | 4/2013 |

OTHER PUBLICATIONS

Lee, Seok Woo et al., "Anomalous Shape of Silicon Nanopillars by Electrochemical Lithiation." Nano Letters, Jun. 9, 2011, vol. 11, pp. 3034-3039.
Jung, Sung Chul et al., "Anisotropic Volume Expansion of Crystalline Silicon during Electrochemical Lithium Insertion: An Atomic Level Rationale." Nano Letters, Sep. 17, 2012, vol. 12, pp. 5342-5347.
International Search Report from PCT/KR2014/004635 dated Sep. 1, 2014.
Office Action from corresponding Taiwanese Appln. No. 103118615, dated Apr. 27, 2015.
Ge, Mingyan et al., "Scalable preparation of porous silicon nanoparticles and their application for lithium-ion battery anodes." Nano Research, vol. 6, No. 3, Mar. 3, 2013, pp. 174-181, XP002739606.
Peng, Kuiqing et al., "Fabrication of Single-Crystalline Silicon Nanowires by Scratching a Silicon Surface with Catalytic Metal Particles." vol. 16, Dec. 31, 2006, pp. 387-394, XP002739634.
Kim, Hyunjung et al. "Three-Dimensional Porous Silicon Particles for Use in High-Performance Lithium Secondary Batteries." Angewandte Chemie, vol. 47, Dec. 31, 2008, pp. 10151-10154, XP002739635.
Supplemental Search Report from corresponding European Appln. No. 14805120, dated May 15, 2015.

* cited by examiner

POROUS SILICON-BASED ANODE ACTIVE MATERIAL, METHOD OF PREPARING THE SAME, AND LITHIUM SECONDARY BATTERY INCLUDING THE ANODE ACTIVE MATERIAL

CROSS-REFERENCE TO RELATED APPLICATIONS

The present application is a continuation of International Patent Application No. PCT/KR2014/004635, filed May 23, 2014, which claims the priority from Korean Application No. 10-2013-0061794, filed May 30, 2013, in the Korean Intellectual Property Office, the disclosures of which are incorporated herein by reference.

TECHNICAL FIELD

The present invention relates to a porous silicon-based anode active material, a method of preparing the same, and a lithium secondary battery including the porous silicon-based anode active material.

BACKGROUND ART

Recently, in line with miniaturization, lightweight, thin profile, and portable trends in electronic devices according to the development of information and telecommunications industry, the need for high energy density batteries used as power sources of such electronic devices has increased. Currently, research into lithium secondary batteries, as batteries that may best satisfy the above need, has actively conducted.

Graphite is mainly used as an anode material of the lithium secondary battery. However, graphite has a low capacity per unit mass of 372 mAh/g and a high-capacity lithium secondary battery may be difficult to be prepared by using graphite.

However, since a silicon-based material has a capacity (4,190 mAh/g) 11 times or more higher than a theoretical capacity (372 mAh/g) of a carbon-based anode active material, the silicon-based material is on the spotlight as a material for replacing the carbon-based anode active material. However, since volume expansion of the silicon-based material during the intercalation of lithium ions is 3 times or more when silicon is only used, the capacity of a battery tends to decrease as charging and discharging of the battery proceed and safety issues may also occur. Thus, many techniques are required to commercialize the silicon-based material.

Therefore, a significant amount of research into an increase in the capacity of an anode active material, such as silicon, i.e., a decrease in a volume expansion coefficient by alloying of silicon, has been conducted. However, since a metal, such as silicon (Si), tin (Sn), and aluminum (Al), is alloyed with lithium during charge and discharge, volume expansion and contraction may occur. Thus, cycle characteristics of the battery may degrade.

Although silicon is known as an element that may most likely provide high capacity, it may be very difficult to amorphize silicon itself alone and it may be also difficult to amorphize an alloy including silicon as a main component. However, a method of easily amorphizing a silicon-based material has recently been developed by using mechanical alloying.

For example, as a method of preparing an anode active material for a lithium secondary battery using a silicon alloy, a method of preparing an anode active material has been developed, in which powders of a silicon element and an element M (where M is nickel (Ni), cobalt (Co), boron (B), chromium (Cr), copper (Cu), iron (Fe), manganese (Mn), titanium (Ti), or yttrium (Y)) are alloyed by mechanical alloying to form a SiM alloy, the SiM alloy is heat treated, and the heat-treated SiM alloy is then alloyed with powder of an element X (where X is silver (Ag), copper (Cu), and gold (Au)) by mechanical alloying to obtain a SiMX alloy.

However, with respect to the anode active material for a lithium secondary battery prepared by the above method, its charge and discharge capacity may be decreased due to the degradation of silicon as charge and discharge cycles proceed. With respect to the mechanical alloying, since the destruction of an alloy structure may occur due to the intercalation and deintercalation of lithium, the cycle characteristics may degrade.

Therefore, there is a need to develop an anode active material which may replace a typical anode active material and may improve discharge capacity, efficiency, and life characteristics when used in the lithium secondary battery.

PRIOR ART DOCUMENTS

Patent Document

KR 1114492 B1

DISCLOSURE OF THE INVENTION

Technical Problem

The present invention provides a porous silicon-based anode active material which may efficiently control volume expansion occurred during charge and discharge of a lithium secondary battery.

The present invention also provides a method of preparing the porous silicon-based anode active material.

The present invention also provides an anode and a lithium secondary battery including the porous silicon-based anode active material.

Technical Solution

According to an aspect of the present invention, there is provided a porous silicon-based anode active material including crystalline silicon (Si) particles; and a plurality of pores on surfaces, or the surfaces and inside of the crystalline silicon particles, wherein at least one plane of crystal planes of at least a portion of the plurality of pores includes a (110) plane.

According to another aspect of the present invention, there is provided a method of preparing a porous silicon-based anode active material including the steps of: (i) depositing metal particles on a surface of a silicon wafer; (ii) etching the silicon wafer by dipping the surface of the silicon wafer having the metal particles deposited thereon in an etching solution to form pores on the surface, or the surface and inside of the silicon wafer; and (iii) contacting the silicon wafer having the pores formed thereon with a metal removal solution to remove the metal particles and grinding the silicon wafer thus obtained to obtain crystalline silicon particles.

According to another aspect of the present invention, there is provided an anode including the anode active material.

According to another aspect of the present invention, there is provided a lithium secondary battery including a cathode, the anode, a separator disposed between the cathode and the anode, and an electrolyte in which a lithium salt is dissolved.

Advantageous Effects

Since a porous silicon-based anode active material according to an embodiment of the present invention may allow volume expansion, which is occurred during charge and discharge of a lithium secondary battery, to be concentrated on pores instead of the outside of the anode active material, the porous silicon-based anode active material may improve life characteristics of the lithium secondary battery by efficiently controlling the volume expansion.

A porous silicon-based anode active material according to another embodiment of the present invention may not only provide enhanced mechanical properties as well as excellent electrical conductivity even after an electrode expands while charge and discharge proceed by further including a carbon coating layer on silicon particles, but may also further improve the performance of a lithium secondary battery by suppressing side reactions with an electrolyte solution.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

A porous silicon-based anode active material according to an embodiment of the present invention includes crystalline silicon (Si) particles and a plurality of pores on surfaces, or the surfaces and inside of the crystalline silicon particles, wherein at least one plane of crystal planes of at least a portion of the plurality of pores includes a (110) plane.

In the porous silicon-based anode active material according to the embodiment of the present invention, since a (110) plane is included in at least one plane of the crystal planes of at least a portion of the plurality of pores, volume expansion occurred during charge and discharge of a lithium secondary battery is allowed to be concentrated on the pores instead of the outside of the anode active material. Thus, the porous silicon-based anode active material may improve life characteristics of the secondary battery by efficiently controlling the volume expansion.

In general, a Si-based material exhibits higher capacity than a carbon-based material, but the volume of the Si-based material may expand because a crystal structure thereof may be changed when absorbing and storing lithium. When the Si-based material absorbs and stores the maximum amount of lithium, the Si-based material may be transformed into $Li_{4.4}Si$ and the volume of $Li_{4.4}Si$ may expand due to charging. With respect to the rate of increase in volume due to the charging, the volume may expand up to about 4.12 times the volume of silicon before the volume expansion.

However, with respect to crystalline silicon, the volume expansion of the silicon during the intercalation of lithium ions is generally severe in a specific direction of a crystal plane of the silicon.

In this regard, the crystal plane of the crystalline silicon may be identified by various methods, and for example, may be measured by X-ray diffraction, a transmission electron microscope (TEM), or nuclear magnetic resonance.

Figure 1:
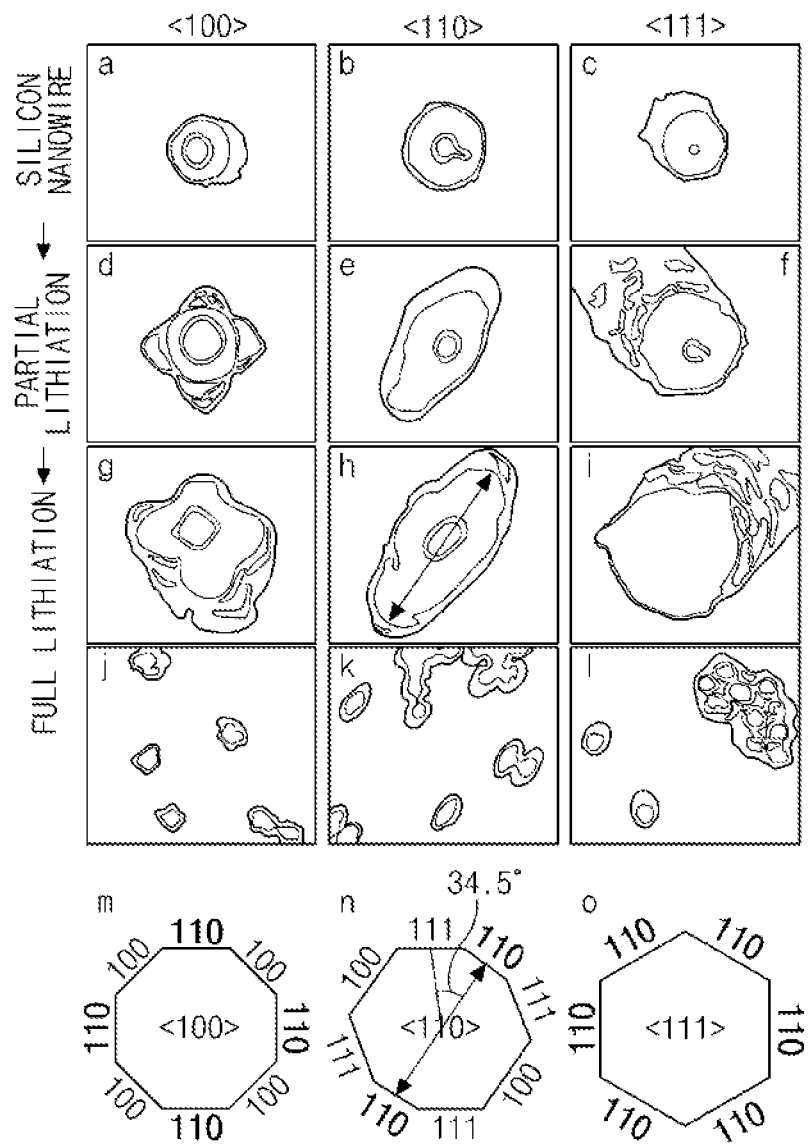
FIG. 1 is a schematic view illustrating forms of volume expansion according to the degree of lithiation of silicon nanowires.

FIG. 1 is a schematic view illustrating forms of volume expansion according to the degree of lithiation of silicon nanowires having different orientations, such as a <100>, <110>, or <111> direction.

That is, FIG. 1 illustrates high magnification images (d to f) of partially lithiated crystalline silicon nanowires at 120 mV vs $Li/Li^+$; high magnification images (g to i) of fully lithiated crystalline silicon nanowires at 10 mV vs $Li/Li^+$; and low magnification images (j to l) of fully lithiated crystalline silicon nanowires with respect to each of a crystalline silicon nanowire (a) oriented in a <100> axis direction (plane direction); a crystalline silicon nanowire (b) oriented in a <110> axis direction; and a crystalline silicon nanowire (c) oriented in a <111> axis direction.

As illustrated in m to o of FIG. 1, when the schematic views of crystal orientations of outer walls of the crystalline silicon nanowires oriented in the <100>, <110>, and <111> axis directions are examined, crystal planes of the crystalline silicon nanowire (a) oriented in the <100> direction may include (110) planes and (100) planes (crystal planes) (m). Also, crystal planes of the crystalline silicon nanowire oriented in the <110> direction may include (100) planes, (111) planes, and (110) planes (n), and all crystal planes of the crystalline silicon nanowire oriented in the <111> direction may be (110) planes (o).

In FIG. 1, with respect to the crystalline silicon nanowire (a) oriented in the <100> axis direction, it may be observed that volume expansion is severe in cruciform (+) directions as the crystalline silicon nanowire (a) is partially or fully lithiated (d, g, and j). In this case, it may be understood that the cruciform (+) directions correspond to the (110) planes among the crystal planes of the crystalline silicon nanowire (m).

Similarly, with respect to the crystalline silicon nanowire (b) oriented in the <110> axis direction, the volume of the crystalline silicon nanowire severely expands in directions of about 34.5 degrees as the crystalline silicon nanowire (b) is partially or fully lithiated (e, h, and k). In this case, the directions of the volume expansion correspond to the (110) planes among the crystal planes of the crystalline silicon nanowire (n).

Also, with respect to the crystalline silicon nanowire (c) oriented in the <111> axis direction, it may be observed that the volume of the crystalline silicon nanowire severely expands in all directions as the crystalline silicon nanowire (c) is fully lithiated (f, i, and l). In this case, it may be understood that the directions of the volume expansion correspond to the (110) planes which are all crystal planes of the crystalline silicon nanowire (o).

According to the present invention, since the plurality of pores are formed on the surfaces or the surfaces and inside of the crystalline silicon particles and the at least one plane of the crystal planes of at least a portion of the plurality of pores includes a (110) plane, the volume expansion occurred during the charge and discharge of the lithium secondary battery is allowed to be concentrated on the pores instead of the outside of the anode active material. Thus, an apparent volume expansion of the anode active material may be minimized.

The anode active material according to the embodiment of the present invention may include a plurality of honeycomb-shaped pores on at least the surfaces or the surfaces and inside of the crystalline silicon particles. In this case, a diameter of the pore is in a range of 10 nm to 2 µm and preferably, in a range of 100 nm to 1 µm. In the case that the diameter of the pore is less than 10 nm, since the diameter of the pore is excessively small, it may be insufficient to accommodate the volume expansion. Thus, the effects of the present invention may be insignificant. In the case in which the diameter of the pore is greater than 2 µm, since the pores may remain even after accommodating the volume expansion, energy density of the active material may be reduced.

Also, the at least one plane of the crystal planes of at least a portion of the plurality of pores may include a (110) Plane, a total number of the crystal planes of the pore may be 6 to 8, and among them, 2 planes, 4 planes, or 6 planes may include (110) planes.

In order for the at least one plane of the crystal planes of the pores to be a (110) plane, the crystalline silicon particles according to the embodiment of the present invention may include at least one or more silicon particles having an axial direction of <110>, <100>, or <111>.

An average particle diameter ($D_{50}$) of the porous silicon-based anode active material according to the embodiment of the present invention is in a range of 100 nm to 50 µm and preferably, in a range of 100 nm to 20 µm.

In the present invention, the average particle diameter ($D_{50}$) of the porous silicon-based anode active material may be defined as a particle diameter at 50% in a cumulative particle diameter distribution. For example, the average particle diameter ($D_{50}$) of the porous silicon-based anode active material according to the embodiment of the present invention may be measured by using a laser diffraction method. The laser diffraction method may generally measure a particle diameter ranging from a submicron level to a few mm, and may obtain highly repeatable and high resolution results.

In the case that the average particle diameter ($D_{50}$) is greater than 50 µm, a uniform volume expansion may be difficult even if pores are included in the inside of the particles, and thus, life characteristics may degrade. In the case in which the average particle diameter ($D_{50}$) is less than 100 nm, since the particle diameter is excessive small, a uniform electrode configuration with a binder and a conductive agent may not be realized.

Figure 2:
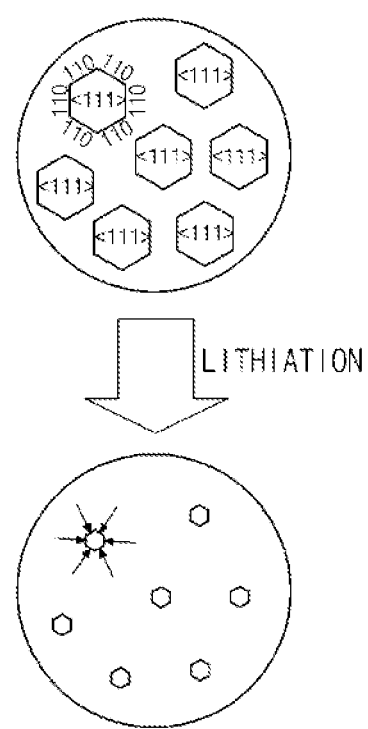
FIG. 2 is an exemplary view illustrating the direction of volume expansion of a porous silicon-based anode active material including crystalline silicon particles having an axial direction of <111> according to an embodiment of the present invention.

FIG. 2 is an exemplary view illustrating the direction of volume expansion of a porous silicon-based anode active material including crystalline silicon particles having an axial direction of <111> according to an embodiment of the present invention.

As illustrated in FIG. 2, since all crystal planes of pores of the crystalline silicon particles having an axial direction of <111> include (110) planes, the volume expansion may be concentrated in all directions of the crystal planes of the pores when lithiation occurs during the intercalation of lithium ions. Thus, the volume expansion may be minimized.

Figure 3:
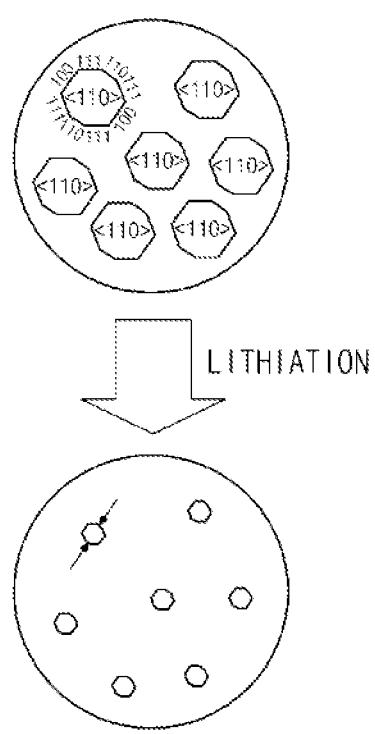
FIG. 3 is an exemplary view illustrating the direction of volume expansion of a porous silicon-based anode active material including crystalline silicon particles having an axial direction of <110> according to an embodiment of the present invention.

Similarly, according to another embodiment of the present invention, as illustrated in FIG. 3, the porous silicon-based anode active material may include crystalline silicon particles having an axial direction of <110>.

Referring to FIG. 3, with respect to the crystalline silicon particles having an axial direction of <110>, volume expansion may be concentrated in a diagonal direction, i.e., directions of (110) planes which is tilted about 34.5 degrees with respect to a (111) plane.

Figure 4:
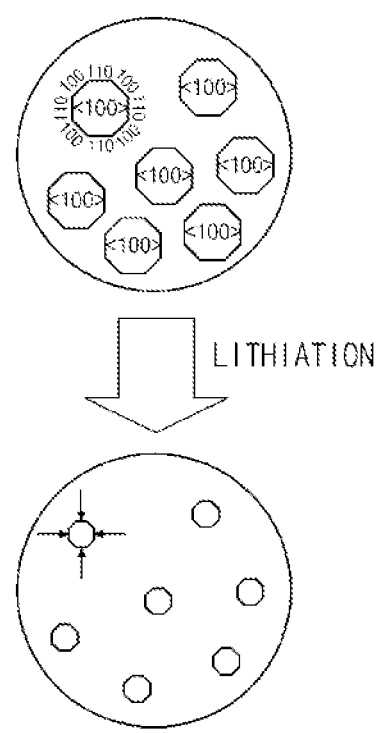
FIG. 4 is an exemplary view illustrating the direction of volume expansion of a porous silicon-based anode active material including crystalline silicon particles having an axial direction of <100> according to an embodiment of the present invention.

Also, as illustrated in FIG. 4 according to another embodiment of the present invention, the porous silicon-based anode active material may include crystalline silicon particles having an axial direction of <100>.

Referring to FIG. 4, with respect to the crystalline silicon particles having an axial direction of <100>, volume expansion may be concentrated in cruciform (+) directions, i.e., directions of (110) planes.

That is, according to an embodiment of the present invention, the volume expansion of the porous silicon-based anode active material may be concentrated in (110) plane directions during the intercalation of lithium ions.

According to an embodiment of the present invention, since the anode active material of the present invention is used, a volume expansion coefficient during the intercalation of lithium ions may be reduced by about 20% to about 80% in comparison to the case of using a typical silicon-based anode active material.

An internal porosity of the porous silicon-based anode active material according to the embodiment of the present invention is in a range of 5% to 90%, preferably, in a range of 20% to 70%, and more preferably, in a range of 20% to 50% based on a total volume of the porous silicon-based anode active material.

Herein, the internal porosity may be defined as follows:

Internal porosity=volume of pores per unit mass/
(specific volume+volume of pores per unit mass)

The measurement of the internal porosity is not particularly limited. According to an embodiment of the present invention, the internal porosity, for example, may be measured by a Brunauer-Emmett-Teller (BET) method or mercury (Hg) porosimetry.

In the case that the internal porosity of the porous silicon-based anode active material is less than 5%, volume expansion of the anode active material during charge and discharge may not be suppressed. In the case in which the internal porosity of the porous silicon-based anode active material is greater than 90%, mechanical strength may be decreased due to a plurality of pores included in the anode active material, and thus, the anode active material may be fractured during manufacturing processes (slurry mixing, pressing after coating, etc.) of a battery.

A specific surface area of the porous silicon-based anode active material according to the embodiment of the present invention is in a range of 0.5 $m^2/g$ to 100 $m^2/g$ and preferably, in a range of 2 $m^2/g$ to 50 $m^2/g$. In the case that the specific surface area is greater than 100 $m^2/g$, a side reaction with an electrolyte solution may be difficult to be controlled due to the wide specific surface area. In the case in which the specific surface area is less than 0.5 $m^2/g$, sufficient pores may not be formed, and thus, the volume expansion during the charge and discharge of a lithium secondary battery may not be effectively accommodated.

In the porous silicon-based anode active material according to the embodiment of the present invention, the plurality of pores may further extend in a (110) plane direction of the pores.

Figure 5:
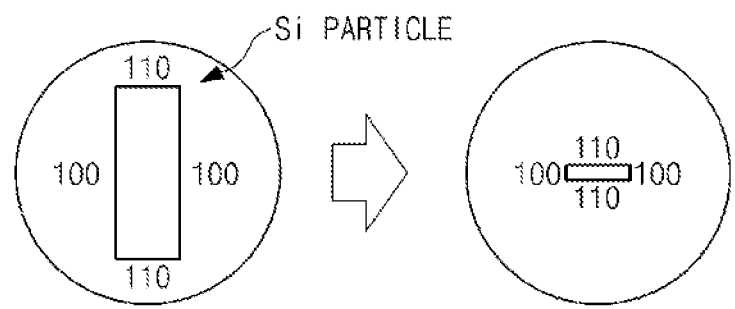
FIGS. 5 and 6 are schematic views illustrating the degree of volume expansion (changes in form) according to a ratio of a length of a plurality of pores in a (110) plane direction to a length of the pores in a plane direction other than the (110) plane direction in porous silicon-based anode active materials under the assumption that the same volume of pores is included.
Figure 6:
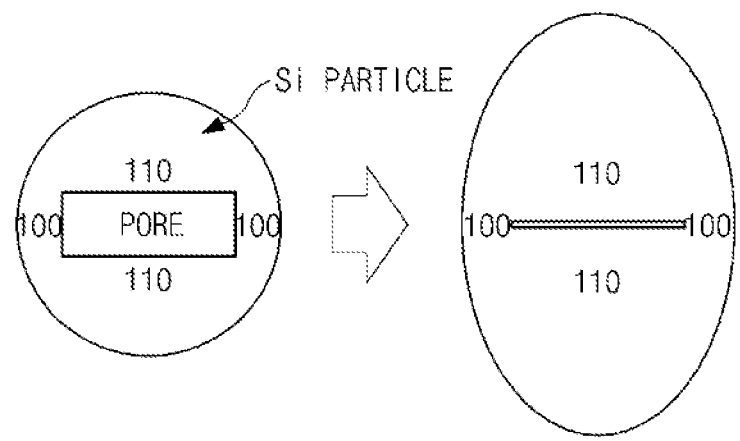

In this regard, FIGS. 5 and 6 are schematic views illustrating the degree of volume expansion (changes in form) according to a ratio of a length of a plurality of pores in a (110) plane direction to a length of the pores in a plane direction other than the (110) plane direction in porous silicon-based anode active materials under the assumption that the same volume of pores is included.

Specifically, in the porous silicon-based anode active material as illustrated in FIG. 5, in the case that the length of the plurality of pores in a (110) plane direction is relatively smaller than the length of the pores in a plane direction other than the (110) plane direction, e.g., a length of the pores in a (100) plane direction, since a sufficient internal space for actual expansion may be secured, a greater volume reduction effect may be obtained at the same pore size and volume.

In contrast, as illustrated in FIG. 6, in the case in which the length of the plurality of pores in a (110) plane direction is relatively greater than the length of the pores in a plane direction other than the (110) plane direction, e.g., a length of the pores in a (100) plane direction, a space for actual expansion is insufficient, and eventually, expansion may occur to the outside of a Si particle.

The porous silicon-based anode active material according to the embodiment of the present invention may further include a carbon coating layer on the crystalline silicon particles.

According to an embodiment of the present invention, since the carbon coating layer on the crystalline silicon particles is further included, mechanical properties are further enhanced. Thus, a particle shape may not only be stably maintained while the particles are not fractured even during rolling, but also electrical conductivity may be further improved by including the carbon coating layer having excellent conductivity on the outer walls of the particles.

A thickness of the carbon coating layer is in a range of 5 nm to 100 nm and preferably, in a range of 5 nm to 50 nm. In the case that the thickness of the carbon coating layer is less than 5 nm, an effect of increasing electrical conductivity due to the carbon coating layer may be insignificant and the reactivity with the electrolyte solution during the application of the active material may be high. Thus, an initial efficiency may be reduced. In the case in which the thickness of the carbon coating layer is greater than 100 nm, since the thickness of the carbon coating layer may be excessively increased to act as a barrier to the mobility of lithium ions, resistance may increase and there may be difficulties in electrode processing due to the hard surface.

Also, the present invention provides a method of preparing a porous silicon-based anode active material including the steps of (i) depositing metal particles on a surface of a silicon wafer; (ii) etching the silicon wafer by dipping the surface of the silicon wafer having the metal particles deposited thereon in an etching solution to form pores on the surface, or the surface and inside of the silicon wafer; and (iii) contacting the silicon wafer having the pores formed thereon with a metal removal solution to remove the metal particles and grinding the silicon wafer thus obtained to obtain crystalline silicon particles.

Specifically, in the method of preparing a porous silicon-based anode active material, step (i) is depositing metal particles on a surface of a silicon wafer.

In step (i), the method of depositing metal particles may include various methods, for example, vacuum-based deposition and solution deposition methods. The vacuum-based deposition method is a method of using high vacuum equipment such as thermal evaporation, electron beam evaporation, and sputtering. The vacuum-based deposition method has advantages in that a high quality thin metal film may be deposited to a precise thickness. In the solution deposition method, such as electrode deposition, electroless deposition, and self assembly, a surface of silicon may be plated by electrochemically reducing metal ions or metal nanoparticles dispersed in a solvent may be fixed to the surface of silicon. The solution deposition method has advantages in that it is relatively simple and low cost in comparison to the expensive and complicated vacuum deposition method.

According to an embodiment of the present invention, a fluorinated solution and a metal precursor solution are mixed and a mixed solution is then in contact with a silicon wafer to deposit metal particles of the metal precursor solution on the silicon wafer.

In this case, the silicon wafer emits electrons due to the fluorinated solution and metal ions in the solution receive electrons to be reduced and deposited on the surface of the silicon wafer. Once the metal particles are deposited on the surface of the silicon wafer, continuous deposition may occur as the metal particle itself becomes a catalyst site.

In order for at least one plane of the crystal planes of the pores of the porous silicon-based anode active material to include a (110) plane according to an embodiment of the present invention, a silicon wafer having an axial direction of <110> in which 2 planes of crystal planes of pores are (110) planes; a silicon wafer having an axial direction of <100> in which 4 planes of crystal planes of pores are (110) planes; or a silicon wafer having an axial direction of <111> in which 6 planes of crystal planes of pores are (110) planes may be used as the above silicon wafer. For example, a silicon wafer having an axial direction of <100> or <111> may be used as the above silicon wafer. Commercial silicon wafers may be purchased and used.

At least one selected from the group consisting of hydrogen fluoride (HF), hydrofluosilicic acid ($H_2SiF_6$), and ammonium fluoride ($NH_4F$) may be used as the fluorinated solution. The metal precursor solution may include at least one metal particle selected from the group consisting of silver (Ag), gold (Au), platinum (Pt), and copper (Cu), and may be a salt form. An anion of the salt may include nitric acid ($NO_3^-$), sulfuric acid ($SO_4^{2-}$), iodine ($I^-$), perchlorate ($ClO_4^-$), acetic acid ($CH_3COO^-$), or a combination thereof. The diameter of the formed pore may be determined according to a diameter of the metal particles, and the diameter of the metal particles may be in a range of 10 nm to 20 μm.

According to an embodiment of the present invention, the fluorinated solution and the metal precursor solution may be mixed in a weight ratio of 10:90 to 90:10. In the case that the weight ratio of the fluorinated solution included is less than 10, an amount of the metal particles deposited on the surface of the silicon wafer may be small and a reaction rate may be very slow, and thus, a preparation time may increase. In the case in which the weight ratio of the fluorinated solution included is greater than 90, deposition rate of the metal particles on the surface of the silicon wafer may be very fast, and thus, uniform and small-sized metal particles may not be deposited on the silicon wafer.

Also, an amount of the metal particles deposited on the silicon wafer may be controlled according to a concentration of the fluorinated solution and a contact time of the surface of the silicon wafer with the metal precursor solution. An amount of the contacted silicon wafer may be in a range of 0.001 parts by weight to 50 parts by weight based on 100 parts by weight of the mixed solution of the fluorinated solution and the metal precursor solution.

According to an embodiment of the present invention, step (ii) is etching the silicon wafer by dipping the surface of the silicon wafer having the metal particles deposited thereon in an etching solution to form pores on the surface, or the surface and inside of the silicon wafer. Nanopores, mesopores, and macropores may be formed through the above etching process.

The etching of the silicon wafer is performed as follows. For example, metal particles become metal ions by being oxidized by $H_2O_2$, the silicon wafer is continuously dissolved while transferring electrons to the metal particles at interfaces between the silicon wafer and the metal particles, and the reduction of the above-described metal ions, which are oxidized from the metal particles deposited on the surface of the silicon wafer, occurs. Accordingly, the silicon wafer in contact with the metal particles may be continuously etched to form a honeycomb-shaped porous structure at least on the surface thereof, and the diameter of the metal particles may increase because the metal particles have a strong tendency of agglomeration with the adjacent metal particles in the etching solution during the etching.

That is, the metal particles may act as a template, and the diameter of pores in the final etched product may be controlled by controlling the diameter and shape of the metal particles.

A mixed solution of a HF solution and a hydrogen peroxide ($H_2O_2$) solution may be used as the etching solution, and an amount of the HF solution included may vary according to the degree of etching. However, the HF solution and the $H_2O_2$ solution may be mixed in a weight ratio of 10:90 to 90:10. In this case, the amount of $H_2O_2$ plays an important role in the formation of pores in silicon.

Also, the etching may be performed for 10 minutes to 5 hours. In the case that the etching is performed less than 10 minutes, the formation of pores may be insignificant. In the case in which the etching is performed greater than 5 hours, the silicon wafer is excessively etched, and thus, mechanical properties of the anode active material may be deteriorated.

In the method of preparing a porous silicon-based anode active material according to the embodiment of the present invention, step (iii) is contacting the silicon wafer having the pores formed thereon with a metal removal solution to remove the metal particles and grinding the silicon wafer thus obtained to obtain crystalline silicon particles.

The metal removal solution used may be at least one selected from the group consisting of nitric acid ($HNO_3$), sulfuric acid ($H_2SO_4$), and hydrochloric acid (HCl).

The grinding, for example, may be performed using a roll-mill, a ball-mill (including wet and dry types), and a jet-mill, and the grinding may be performed to obtain a diameter of the anode active material of 100 nm to 50 μm.

Also, according to the method of preparing a porous silicon-based anode active material according to the embodiment of the present invention, after step (iii), the method may further include coating surfaces of the crystalline silicon particles with carbon by mixing the crystalline silicon particles with a carbon precursor and then performing a heat treatment, and thus, the porous silicon-based anode active material may further include a carbon coating layer on the surfaces of the crystalline silicon particles.

According to an embodiment of the present invention, the coating may include coating with pyrolytic carbon using at least one gas or liquid carbon source selected from the group consisting of hydrocarbon gas, methane, ethane, ethylene, butane, acetylene, carbon monoxide, propane, and propylene; or coating with liquid or solid pitch.

Also, the carbon coating layer according to an embodiment of the present invention may be obtained by dispersing the carbon precursor in a solvent, mixing the dispersion with the crystalline silicon particles, and then drying and performing a heat treatment.

Any carbon precursor may be used without limitation so long as it may form carbon by a heat treatment, and for example, pitch or a hydrocarbon-based material may be used. Examples of the hydrocarbon-based material may be furfuryl alcohol or a phenol-based resin.

Also, for example, tetrahydrofuran (THF) and alcohol may be used as the solvent for forming the carbon coating layer, and the coating may be performed by sintering in a heat treatment temperature range of 300° C. to 1,400° C.

The present invention may also provide an anode including the porous silicon-based anode active material.

Furthermore, the present invention may provide a lithium secondary battery including a cathode, an anode, a separator disposed between the cathode and the anode, and an electrolyte in which a lithium salt is dissolved, wherein the anode includes the porous silicon-based anode active material.

An anode active material according to an embodiment of the present invention may be used in a secondary battery by mixing the porous silicon-based anode active material with a typically used anode active material, and the typically used anode active material may be at least one selected from the group consisting of graphite, soft carbon, hard carbon, and lithium titanium oxide.

The anode active material thus prepared may be used to prepare an anode by a typical method in the art. For example, the anode active material according to the embodiment of the present invention is mixed with a binder, a solvent, and a conductive agent and a dispersant if necessary, and stirred to prepare a slurry. Then, a current collector may be coated with the slurry and pressed to prepare an anode.

Various types of binder polymers, such as a polyvinylidene fluoride-hexafluoropropylene copolymer (PVDF-co-HEP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber (SBR), a fluorine rubber, poly acrylic acid, and a polymer having hydrogen thereof substituted with lithium (Li), sodium (Na), and calcium (Ca), or various copolymers, may be used as the binder. N-methylpyrrolidone, acetone, or water may be used as the solvent.

Any conductive agent may be used without particular limitation so long as it has suitable conductivity without causing adverse chemical changes in the batteries. For example, the conductive agent may include a conductive material such as: graphite such as natural graphite and artificial graphite; carbon black such as acetylene black, Ketjen black, channel black, furnace black, lamp black, and thermal black; conductive fibers such as carbon fibers and metal fibers; conductive tubes such as carbon nanotubes; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives.

An aqueous-based dispersant or an organic dispersant, such as N-methyl-2-pyrrolidone, may be used as the dispersant.

Similar to the preparation of the anode, a cathode active material, a conductive agent, a binder, and a solvent are mixed to prepare a slurry, and a cathode may then be prepared by directly coating a metal current collector with the slurry or by casting the slurry on a separate support and laminating a cathode active material film separated from the support on a metal current collector.

Examples of the cathode active material may be a layered compound, such as lithium cobalt oxide ($LiCoO_2$), lithium nickel oxide ($LiNiO_2$), $Li[Ni_xCo_yMn_zM_v]O_2$ (where M is any one selected from the group consisting of aluminum (Al), gallium (Ga), and indium (In), or two or more elements thereof; and $0.3 \leq x < 0.1$, $0 \leq y$, $z \leq 0.5$, $0 \leq v \leq 0.1$, and $x+y+z+v=1$), Li ($Li_aM_{b-a-b}M'_{b'})O_{2-c}A_c$ (where $0 \leq a \leq 0.2$, $0.6 \leq b \leq 1$, $0 \leq b' \leq 0.2$, and $0 \leq c \leq 0.2$; M includes manganese (Mn) and at least one selected from the group consisting of nickel (Ni), cobalt (Co), iron (Fe), chromium (Cr), vanadium (V), copper (Cu), zinc (Zn), and titanium (Ti); M' is at least one selected from the group consisting of Al, magnesium (Mg), and boron (B); and A is at least one selected from the group consisting of phosphorus (P), fluorine (F), sulfur (S), and nitrogen (N)), or a compound substituted with at least one transition metal; lithium manganese oxides such as the chemical formula $Li_{1+y}Mn_{2-y}O_4$ (where y ranges from 0 to 0.33), $LiMnO_3$, $LiMn_2O_3$, and $LiMnO_2$; lithium copper oxide ($Li_2CuO_2$); vanadium oxides such as $LiV_3O_8$, $LiFe_3O_4$, $V_2O_5$, and $Cu_2V_2O_7$; Ni-site type lithium nickel oxide expressed by the chemical formula $LiNi_{1-y}M_yO_2$ (where M is Co, Mn, Al, Cu, Fe, Mg, B, or Ga, and y ranges from 0.01 to 0.3); lithium manganese complex oxide expressed by the chemical formula $LiMn_{2-y}M_yO_2$ (where M is Co, Ni, Fe, Cr, Zn, or tantalum (Ta), and y ranges from 0.01 to 0.1) or $Li_2Mn_3MO_8$ (where M is Fe, Co, Ni, Cu, or Zn); $LiMn_2O_4$ having a part of lithium (Li) being substituted with alkaline earth metal ions; a disulfide compound; and a complex oxide formed of $Fe_2(MoO_4)_3$. However, the cathode active material is not limited thereto.

A typical porous polymer film used as a typical separator, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator. Also, a nonwoven porous nonwoven fabric, for example, a nonwoven fabric formed of high melting point glass fibers or polyethylene terephthalate fibers, and a polymer separator base material having at least one surface thereof coated with ceramic may be used. However, the present invention is not limited thereto.

In an electrolyte solution used in an embodiment of the present invention, a lithium salt, which may be included as the electrolyte, may be used without limitation so long as it is typically used in an electrolyte solution for a secondary battery. For example, one selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ may be used as an anion of the lithium salt.

In the electrolyte solution used in an embodiment of the present invention, an organic solvent included in the electrolyte solution may be used without limitation so long as it is typically used. Typically, any one selected from the group consisting of propylene carbonate, ethylene carbonate, diethyl carbonate, dimethyl carbonate, ethylmethyl carbonate, methylpropyl carbonate, dipropyl carbonate, fluoroethylene carbonate, dimethyl sulfoxide, acetonitrile, dimethoxyethane, diethoxyethane, vinylene carbonate, sulfolane, γ-butyrolactone, propylene sulfite, tetrahydrofuran, methyl formate, methyl acetate, ethyl acetate, isopropyl acetate, isoamyl acetate, methyl propionate, ethyl propionate, propyl propionate, butyl propionate, methyl butylate, and ethyl butylate, or a mixture of two or more thereof may be used.

In particular, ethylene carbonate and propylene carbonate, ring-type carbonates among the carbonate-based organic solvents, well dissociate the lithium salt in the electrolyte due to high dielectric constants as high-viscosity organic solvents, and thus, the ring-type carbonate may be used. Since an electrolyte having high electrical conductivity may be prepared when the ring-type carbonate is mixed with low-viscosity, low-dielectric constant linear carbonate, such as dimethyl carbonate and diethyl carbonate, in an appropriate ratio, the ring-type carbonate, for example, may be used.

Selectively, the electrolyte stored according to the present invention may further include an additive, such as an overcharge inhibitor, included in a typical electrolyte.

A separator is disposed between the cathode and the anode to form an electrode assembly, the electrode assembly is put in a cylindrical battery case or prismatic battery case or aluminum pouch, and a secondary battery is then completed when the electrolyte is injected thereinto. Also, the electrode assembly is stacked and impregnated with the electrolyte solution, and a lithium secondary battery is then completed when the product thus obtained is put in a battery case and sealed.

The lithium secondary battery according to the present invention may not only be used in a battery cell that is used as a power source of a small device, but may also be used as a unit cell in a medium and large sized battery module including a plurality of battery cells. Preferred examples of the medium and large sized device may be an electric vehicle, a hybrid electric vehicle, a plug-in hybrid electric vehicle, or a power storage system, but the medium and large sized device is not limited thereto.

Hereinafter, the present invention will be described in detail, according to specific examples. The invention may, however, be embodied in many different forms and should not be construed as being limited to the embodiments set forth herein. Rather, these example embodiments are provided so that this description will be thorough and complete, and will fully convey the scope of the present inventive concept to those skilled in the art.

EXAMPLES

Example 1

Preparation of Porous Silicon-Based Anode Active Material in which all 6 Planes of Crystal Planes of Pores are (110) Planes <Step (i): Depositing Metal Particles on the Surface of Silicon Wafer>

300 ml of a 10 mol % hydrogen fluoride (HF) solution and 300 ml of a 10 mM silver nitrate ($AgNO_3$) solution were mixed for 10 minutes. A silicon wafer (LG Siltron) having an axial direction of <111> was added to the solution, in which HF and silver nitrate were mixed, and mixed for 5 minutes. Then, the solution was filtered, washed, and dried to deposit Ag on the surface of the silicon wafer.

<Step (ii): Forming Pores by Etching>

200 ml of a 5 mol % HF solution and 100 ml of a 1.5 wt % hydrogen peroxide ($H_2O_2$) solution were mixed for 10 minutes. The silicon wafer having Ag particles deposited thereon, which had been obtained in step (i), was added to the etching solution, in which HF and hydrogen peroxide were mixed, and mixed for 30 minutes. Then, the solution was filtered, washed, and dried to form pores on the surface and inside of the silicon wafer.

<Step (iii): Removing Metal Particles>

100 ml of 60 mol % nitric acid ($HNO_3$) was heated to 50° C. and the porous silicon wafer obtained in step (ii) was then added thereto and mixed for 2 hours. Then, the solution was filtered, washed, and dried to remove Ag. The porous silicon wafer was ground to an appropriate size using a mortar, the ground porous silicon wafer was then ball milled in an argon (Ar) atmosphere, and the ball-milled porous silicon wafer was finally sieved (625 mesh sieve: 20 μm mesh size) to prepare a porous silicon anode active material.

In the prepared porous silicon anode active material, all 6 planes of crystal planes of pores were (110) planes.

Example 2

Preparation of Porous Silicon-Based Anode Active Material in which 4 Planes Among Crystal Planes of Pores are (110) Planes A porous silicon-based anode active material was prepared in the same manner as in Example 1 except that a silicon wafer (LG Siltron) having an axial direction of <100> was used instead of the silicon wafer having an axial direction of <111> in step (i) of Example 1. In the prepared porous silicon anode active material, 4 planes among crystal planes of pores were (110) planes.

Example 3

Preparation of Porous Silicon-Based Anode Active Material in which 2 Planes Among Crystal Planes of Pores are (110) Planes A porous silicon-based anode active material was prepared in the same manner as in Example 1 except that a silicon wafer (LG Siltron) having an axial direction of <110> was used instead of the silicon wafer having an axial direction of <111> in step (i) of Example 1. In the prepared porous silicon anode active material, 2 planes among crystal planes of pores were (110) planes.

Example 4

Preparation of Secondary Battery

The porous silicon anode active material prepared in Example 1, acetylene black as a conductive agent, and lithium polyacrylate as a binder were mixed at a weight ratio of 70:10:20, and the mixture was mixed with a N-methyl-2-pyrrolidone solvent to prepare a slurry. One surface of a copper current collector was coated with the prepared slurry to a thickness of 30 μm, dried, and rolled. Then, an anode was prepared by punching into a predetermined size.

10 wt % fluoroethylene carbonate based on a total weight of an electrolyte solution was added to a mixed solvent, which includes 1.0 M $LiPF_6$ and an organic solvent prepared by mixing ethylene carbonate and diethyl carbonate at a weight ratio of 30:70, to prepare a non-aqueous electrolyte solution.

A lithium foil was used as a counter electrode, a polyolefin separator was disposed between both electrodes, and a coin-type secondary battery was then prepared by injecting the electrolyte solution.

Examples 5 and 6

Preparation of Secondary Battery

Secondary batteries were respectively prepared in the same manner as in Example 4 except that the anode active materials prepared in Examples 2 and 3 were used instead of using the porous silicon anode active material prepared in Example 1.

Comparative Example 1

Preparation of Silicon Anode Active Material without Pores

A silicon wafer (LG Siltron) having an axial direction of <111> was ground to an appropriate size using a mortar, the ground silicon wafer was then ball milled in an Ar atmosphere, and the ball-milled silicon wafer was finally sieved (625 mesh sieve: 20 μm mesh size) to prepare a silicon anode active material without pores.

Comparative Example 2

Preparation of Secondary Battery

A secondary battery was prepared in the same manner as in Example 4 except that the anode active material prepared in Comparative Example 1 was used instead of using the porous silicon anode active material prepared in Example 1.

Experimental Example 1

Analysis of Shape and Crystal Structure of Porous Silicon-Based Anode Active Material An X-ray diffraction (XRD) analysis was performed to investigate the shape and crystal structure of the porous silicon-based anode active material according to the embodiment of the present invention.

Experimental Example 2

Life Characteristics, and Thickness Change Rate Analysis

The following experiments were performed in order to investigate life characteristics and thickness change rates of the secondary batteries prepared in Examples 4 to 6 and Comparative Example 2.

Life characteristics of each battery were measured by performing charge and discharge at 0.1 C in a first cycle and the life characteristics were represented as a ratio of discharge capacity in a 49th cycle to the first cycle discharge capacity. Each secondary battery was disassembled in a charge state of a 50th cycle and a thickness of an electrode was measured. Then, a thickness change rate was obtained by comparing the above thickness with a thickness of the electrode before the first cycle.

The following Table 1 presents internal porosities, life characteristics, and thickness change rates of the secondary batteries prepared in Examples 4 to 6 and Comparative Example 2.

TABLE 1

| Examples | Internal Porosity (%) | Life characteristics (%) | Thickness change rate (%) |
|---|---|---|---|
| Example 4 | 51 | 96 | 75 |
| Example 5 | 48 | 93 | 89 |
| Example 6 | 50 | 85 | 142 |
| Comparative Example 2 | 0 | 13 | 320 |

Life characteristics: (discharge capacity in a 49th cycle/first cycle discharge capacity)×100

Thickness change rate: (electrode thickness in a charge state of a 50th cycle−electrode thickness before a first cycle)/electrode thickness before the first cycle×100

Internal porosity=volume of pores per unit mass/(specific volume+volume of pores per unit mass)

(use BELSORP (BET instrument) by BEL Japan Inc., use values calculated by the Barrett-Joyner-Halenda (BJH) method, i.e., a mesopore measurement method)

As illustrated in Table 1, the lithium secondary batteries of Examples 4 to 6 using the anode active materials, in which at least one plane of crystal planes of pores included a (110) plane according to the present invention, exhibited significant differences in life characteristics and thickness change rate in comparison to the lithium secondary battery of Comparative Example 2 using the anode active material without pores.

Specifically, with respect to the lithium secondary batteries of Examples 4 to 6 of the present invention, since the at least one plane of the crystal planes of the pores in the porous silicon anode active material included the (110) plane, the volume expansion occurred during the charge and discharge of the secondary battery was allowed to be concentrated on the pores of the anode active material. Thus, the volume expansion may be efficiently controlled to about 25% or more. Therefore, it may be confirmed that the thickness change rates of Examples 4 to 6 were significantly lower than that of Comparative Example 2 without pores, and accordingly, the life characteristics were improved by about 70% or more.

INDUSTRIAL APPLICABILITY

Since a porous silicon-based anode active material according to an embodiment of the present invention may allow volume expansion, which is occurred during charge and discharge of a lithium secondary battery, to be concentrated on pores instead of the outside of the anode active material, the porous silicon-based anode active material may improve life characteristics of the lithium secondary battery by efficiently controlling the volume expansion.

The invention claimed is:

1. A porous silicon-based anode active material comprising:
   crystalline silicon (Si) particles; and
   a plurality of honeycomb-shaped pores on surfaces, or the surfaces and inside of the crystalline silicon particles,
   wherein at least one plane of crystal planes of at least a portion of the plurality of honeycomb-shaped pores comprises a (110) plane and a length of the plurality of pores in the (110) plane direction of the pores is relatively smaller than a length of the pores in a plane direction other than the (110) plane direction.

2. The porous silicon-based anode active material of claim 1, wherein 2 planes, 4 planes, or 6 planes of the crystal planes of the at least a portion of the plurality of pores comprise (110) planes.

3. The porous silicon-based anode active material of claim 1, wherein the crystalline silicon particles comprise silicon particles having an axial direction of <110>, <100>, or <111>.

4. The porous silicon-based anode active material of claim 1, wherein a diameter of the honeycomb-shaped pores is in a range of 10 nm to 2 μm.

5. The porous silicon-based anode active material of claim 1, wherein an average particle diameter ($D_{50}$) of the porous silicon-based anode active material is in a range of 100 nm to 50 μm.

6. The porous silicon-based anode active material of claim 1, wherein a specific surface area of the porous silicon-based anode active material is in a range of 0.5 $m^2/g$ to 100 $m^2/g$.

7. The porous silicon-based anode active material of claim 1, wherein an internal porosity of the porous silicon-based anode active material is in a range of 5% to 90%.

8. The porous silicon-based anode active material of claim 1, wherein a volume of the porous silicon-based anode active material expands in a (110) plane direction of the honeycomb-shaped pores during intercalation of lithium ions.

9. The porous silicon-based anode active material of claim 1, wherein the plurality of honeycomb-shaped pores further extend in a (110) plane direction of the honeycomb-shaped pores.

10. The porous silicon-based anode active material of claim 1, further comprising a carbon coating layer on the crystalline silicon particles.

11. The porous silicon-based anode active material of claim 10, wherein a thickness of the carbon coating layer is in a range of 5 nm to 100 nm.

12. A method of preparing a porous silicon-based anode active material according to claim 1, the method comprising the steps of:
   (i) depositing metal particles on a surface of a silicon wafer;

(ii) etching the silicon wafer by dipping the surface of the silicon wafer having the metal particles deposited thereon in an etching solution to form honeycomb-shaped pores on the surface, or the surface and inside of the silicon wafer; and (iii) contacting the silicon wafer having the pores formed thereon with a metal removal solution to remove the metal particles and grinding the silicon wafer thus obtained to obtain crystalline silicon particles, and the silicon wafer has an axial direction of <110>, <100>, or <111>.

13. The method of claim 12, wherein the silicon wafer has an axial direction of <100>or <111>.

14. The method of claim 12, wherein the depositing of the metal particles is performed by mixing a fluorinated solution and a metal precursor solution, and contacting the silicon wafer with the mixed solution.

15. The method of claim 14, wherein the fluorinated solution comprises at least one selected from the group consisting of hydrogen fluoride (HF), hydrofluosilicic acid ($H_2SiF_6$), and ammonium fluoride ($NH_4F$).

16. The method of claim 14, wherein the metal precursor solution comprises at least one metal particle selected from the group consisting of silver, gold, platinum, and copper.

17. The method of claim 14, wherein the fluorinated solution and the metal precursor solution are mixed in a weight ratio of 10:90 to 90:10.

18. The method of claim 14, wherein an amount of the contacted silicon wafer is in a range of 0.001 parts by weight to 50 parts by weight based on 100 parts by weight of the mixed solution of the fluorinated solution and the metal precursor solution.

19. The method of claim 12, wherein the etching solution is a mixed solution of a HF solution and a hydrogen peroxide ($H_2O_2$) solution.

20. The method of claim 19, wherein the HF solution and the $H_2O_2$ solution are mixed in a weight ratio of 10:90 to 90:10.

21. The method of claim 12, wherein the etching is performed for 10 minutes to 5 hours.

22. The method of claim 12, wherein the metal removal solution comprises at least one selected from the group consisting of nitric acid, sulfuric acid, and hydrochloric acid.

23. The method of claim 12, further comprising coating surfaces of the crystalline silicon particles with carbon by mixing the crystalline silicon particles with a carbon precursor and performing a heat treatment, after step (iii).

24. The method of claim 23, wherein the carbon precursor comprises pitch or a hydrocarbon-based material.

25. The method of claim 23, wherein the heat treatment is performed in a temperature range of 300° C. to 1,400° C.

26. An anode comprising the porous silicon-based anode active material of claim 1.

27. A lithium secondary battery comprising:

a cathode;

an anode;

a separator disposed between the cathode and the anode; and an electrolyte in which a lithium salt is dissolved, wherein the anode is the anode of claim 26.

* * * * *